United States Patent [19]
Paek et al.

[11] Patent Number: 5,438,440
[45] Date of Patent: Aug. 1, 1995

[54] HOLOGRAPHIC CODE DIVISION MULTIPLE ACCESS

[75] Inventors: Eung G. Paek, Freehold; Jawad A. Salehi, Bedminster, both of N.J.

[73] Assignee: Bell Communications Research, Inc., Livingston, N.J.

[21] Appl. No.: 6,008

[22] Filed: Jan. 15, 1993

Related U.S. Application Data

[62] Division of Ser. No. 824,785, Jan. 15, 1992, Pat. No. 5,216,529.

[51] Int. Cl.[6] .................... G03H 1/12; G03H 1/16; G02B 27/46; G06K 11/00
[52] U.S. Cl. .......................... 359/11; 359/29; 359/559; 382/210
[58] Field of Search ............ 359/10, 11, 29, 559, 359/560, 561; 364/822, 827; 382/31, 42

[56] References Cited

U.S. PATENT DOCUMENTS

| | | | |
|---|---|---|---|
| 3,612,641 | 10/1971 | Eaglesfield | 359/11 |
| 3,985,975 | 10/1976 | Steensma | 359/11 |
| 4,062,618 | 12/1977 | Steensma | 359/11 |
| 4,360,797 | 11/1982 | Fenimore et al. | 382/42 |
| 4,389,633 | 6/1983 | Fenimore | 382/42 |
| 4,892,370 | 1/1990 | Lee | 359/29 |
| 5,036,546 | 7/1991 | Gottesman et al. | 382/42 |
| 5,056,039 | 10/1991 | Caulfield | 364/822 |
| 5,111,314 | 5/1992 | Leib | 359/29 |
| 5,138,489 | 8/1992 | Paek | 359/29 |
| 5,155,606 | 10/1992 | Landesman | 359/29 |
| 5,235,440 | 8/1993 | Clark et al. | 359/10 |

OTHER PUBLICATIONS

"Spread Spectrum for Commercial Communications", D. L. Schilling, et al., IEEE Comm. Magazine, vol. 29, No. 4, pp. 66–79, Apr. 1991.

"Spread-Time Code Division Multiple Access", P. Crespo et al., Globecom '91, pp. 836–840, 1991.

"Psuedo-Random Sequences and Arrays", F. J. MacWilliams, et al. Proc of IEEE, vol. 64, No. 12, pp. 1715–1729, Dec. 1976.

"Signal Detection by Complex Spatial Filtering", A. Vander Lugt, IEEE Trans. of Info. Theory, IT 10:2, pp. 132–145, Apr. 1964.

"Introduction to Fourier Optics", J. W. Goodman, McGraw-Hill Book Company, pp. 171–184, 1968.

"Emerging Optical Code-Division Multiple Access Communications Systems", J. A. Salehi, IEEE Network Magazine, vol. 3, No. 2, pp. 31–39, Mar. 1989.

*Primary Examiner*—Loha Ben
*Assistant Examiner*—John Juba, Jr.
*Attorney, Agent, or Firm*—Leonard Charles Suchyta; James W. Falk

[57] ABSTRACT

A technique for all-optical Code Division Multiple Access (CDMA) system based on optical holography is disclosed. In this technique the energy of an incoming information light signal is spread over a spatial domain by a two-dimensional spatial encoder which includes a mask having regions of first and second transmission characteristics corresponding to the unique code assigned to a particular source. Subsequent decoding, which is accomplished by an optical matched filter through the use of a hologram, spatially despreads the energy of the information light signal and produces a focused light beam which serves as input to a code division detector.

2 Claims, 6 Drawing Sheets

| Y\X | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1 | 1 | 1 | 0 | 0 | 0 | 1 | 1 | 1 | 0 | 1 | 1 | 0 | 1 | 1 | 0 | 1 | 1 | 1 | 0 | 0 | 0 | 0 | 1 | 1 | 1 | 0 | 1 | 0 | 1 | 0 | 1 | 1 |
| 2 | 1 | 1 | 1 | 0 | 1 | 1 | 1 | 0 | 0 | 1 | 1 | 0 | 1 | 1 | 0 | 1 | 0 | 1 | 1 | 1 | 1 | 1 | 1 | 0 | 0 | 1 | 1 | 0 | 1 | 0 | 1 | 0 |
| 3 | 0 | 1 | 0 | 0 | 0 | 0 | 0 | 0 | 0 | 0 | 0 | 0 | 1 | 1 | 0 | 1 | 0 | 1 | 0 | 0 | 0 | 0 | 1 | 0 | 1 | 1 | 1 | 1 | 1 | 0 | 1 | 1 |
| 4 | 0 | 0 | 1 | 0 | 1 | 0 | 1 | 0 | 1 | 1 | 0 | 0 | 0 | 1 | 1 | 1 | 1 | 1 | 1 | 1 | 1 | 1 | 0 | 0 | 1 | 0 | 1 | 0 | 0 | 1 | 0 | 0 |
| 5 | 0 | 1 | 1 | 0 | 0 | 1 | 0 | 0 | 0 | 0 | 1 | 0 | 0 | 0 | 0 | 1 | 1 | 0 | 1 | 1 | 0 | 0 | 0 | 1 | 1 | 1 | 0 | 1 | 1 | 1 | 1 | 0 |
| 6 | 1 | 1 | 0 | 1 | 0 | 0 | 1 | 1 | 1 | 1 | 1 | 0 | 1 | 1 | 1 | 0 | 0 | 1 | 0 | 0 | 1 | 0 | 0 | 0 | 1 | 1 | 0 | 0 | 1 | 1 | 1 |
| 7 | 1 | 1 | 0 | 0 | 0 | 0 | 1 | 1 | 1 | 1 | 1 | 1 | 0 | 1 | 0 | 1 | 1 | 0 | 1 | 0 | 0 | 1 | 1 | 0 | 1 | 0 | 1 | 1 | 1 |
| 8 | 1 | 0 | 0 | 1 | 0 | 1 | 1 | 0 | 0 | 0 | 1 | 1 | 0 | 1 | 0 | 1 | 0 | 0 | 0 | 0 | 0 | 0 | 1 | 0 | 1 | 0 | 1 | 0 | 1 | 0 |
| 9 | 0 | 0 | 1 | 0 | 0 | 0 | 1 | 1 | 0 | 0 | 1 | 0 | 0 | 1 | 0 | 1 | 0 | 0 | 1 | 0 | 1 | 1 | 1 | 1 | 0 | 0 | 0 | 0 | 1 |
| 10 | 1 | 1 | 0 | 1 | 0 | 0 | 0 | 1 | 0 | 1 | 0 | 1 | 1 | 0 | 0 | 1 | 0 | 1 | 1 | 0 | 1 | 1 | 0 | 1 | 0 | 1 | 0 | 1 | 0 |
| 11 | 1 | 1 | 1 | 0 | 1 | 1 | 0 | 1 | 0 | 1 | 0 | 1 | 1 | 0 | 0 | 0 | 1 | 0 | 1 | 1 | 0 | 0 | 0 | 1 | 0 | 0 | 0 | 1 | 0 | 0 | 1 | 0 |
| 12 | 0 | 0 | 1 | 0 | 0 | 0 | 0 | 1 | 1 | 0 | 0 | 1 | 0 | 1 | 1 | 0 | 0 | 0 | 1 | 0 | 0 | 0 | 0 | 1 | 0 | 0 | 1 | 0 | 1 | 1 | 1 | 0 |
| 13 | 1 | 0 | 0 | 0 | 0 | 1 | 0 | 1 | 1 | 1 | 0 | 1 | 0 | 0 | 0 | 0 | 1 | 0 | 1 | 0 | 1 | 1 | 1 | 1 | 0 | 1 | 1 |
| 14 | 1 | 0 | 0 | 0 | 0 | 1 | 0 | 1 | 0 | 1 | 0 | 1 | 1 | 0 | 1 | 0 | 0 | 1 | 1 | 0 | 1 | 0 | 0 | 0 | 1 | 0 | 0 | 0 | 1 | 1 |
| 15 | 0 | 0 | 0 | 1 | 0 | 1 | 1 | 0 | 1 | 1 | 0 | 1 | 0 | 1 | 0 | 0 | 1 | 1 | 0 | 0 | 1 | 0 | 1 | 0 | 0 | 0 | 0 | 1 | 0 | 0 |
| 16 | 1 | 0 | 1 | 0 | 1 | 0 | 0 | 0 | 0 | 0 | 1 | 1 | 1 | 0 | 1 | 0 | 1 | 0 | 0 | 0 | 0 | 1 | 0 | 1 | 1 | 0 | 1 | 1 | 0 |
| 17 | 1 | 0 | 1 | 1 | 0 | 0 | 0 | 1 | 0 | 1 | 1 | 1 | 1 | 0 | 0 | 1 | 0 | 0 | 1 | 0 | 1 | 1 | 1 | 1 | 1 | 0 | 1 | 1 | 1 | 0 | 1 |
| 18 | 1 | 1 | 0 | 0 | 1 | 1 | 0 | 0 | 0 | 1 | 1 | 1 | 1 | 0 | 1 | 0 | 0 | 0 | 1 | 0 | 1 | 1 | 0 | 1 | 0 | 0 | 0 | 1 | 1 | 0 |
| 19 | 0 | 1 | 0 | 0 | 0 | 1 | 1 | 1 | 0 | 0 | 1 | 1 | 1 | 0 | 0 | 0 | 1 | 0 | 0 | 0 | 0 | 1 | 0 | 1 | 1 | 0 | 0 | 1 | 0 |
| 20 | 0 | 1 | 0 | 1 | 0 | 1 | 0 | 1 | 0 | 0 | 1 | 0 | 1 | 0 | 1 | 0 | 0 | 0 | 0 | 1 | 1 | 0 | 1 | 1 | 1 | 0 | 0 | 1 | 0 | 0 |
| 21 | 0 | 0 | 0 | 1 | 0 | 0 | 0 | 1 | 1 | 1 | 0 | 0 | 1 | 0 | 1 | 0 | 1 | 1 | 0 | 0 | 0 | 1 | 0 | 0 | 0 | 1 | 0 | 0 |
| 22 | 0 | 1 | 1 | 1 | 1 | 0 | 0 | 1 | 0 | 0 | 0 | 0 | 0 | 0 | 0 | 0 | 1 | 0 | 0 | 1 | 1 | 0 | 0 | 1 | 1 | 0 | 0 | 1 | 0 | 1 |
| 23 | 1 | 0 | 0 | 0 | 0 | 1 | 1 | 0 | 0 | 0 | 0 | 1 | 1 | 0 | 1 | 0 | 1 | 0 | 1 | 0 | 1 | 0 | 0 | 1 | 0 | 0 | 1 | 1 | 1 | 1 | 0 |
| 24 | 1 | 0 | 1 | 0 | 0 | 0 | 0 | 1 | 1 | 0 | 1 | 0 | 0 | 1 | 0 | 1 | 1 | 0 | 1 | 1 | 0 | 0 | 0 | 0 | 0 | 0 | 1 | 0 | 1 | 1 | 1 |
| 25 | 1 | 1 | 0 | 0 | 0 | 1 | 1 | 0 | 0 | 0 | 1 | 1 | 0 | 0 | 0 | 1 | 0 | 0 | 1 | 0 | 1 | 1 | 0 | 0 | 1 | 0 | 1 | 0 | 1 | 1 |
| 26 | 0 | 1 | 1 | 0 | 1 | 1 | 0 | 1 | 1 | 0 | 0 | 1 | 0 | 0 | 0 | 1 | 1 | 0 | 1 | 0 | 1 | 0 | 1 | 0 | 1 | 1 | 1 | 1 | 0 | 1 | 1 | 0 | 1 |
| 27 | 1 | 1 | 0 | 1 | 0 | 0 | 1 | 1 | 1 | 1 | 0 | 1 | 0 | 0 | 0 | 1 | 1 | 0 | 1 | 0 | 1 | 0 | 1 | 1 | 1 | 0 | 1 | 0 | 1 | 1 | 0 | 1 |
| 28 | 0 | 0 | 1 | 1 | 0 | 1 | 1 | 0 | 0 | 0 | 0 | 1 | 0 | 0 | 1 | 0 | 1 | 0 | 1 | 0 | 1 | 1 | 1 | 0 | 1 | 1 | 0 | 1 | 0 | 1 | 1 |
| 29 | 1 | 0 | 0 | 1 | 1 | 0 | 0 | 0 | 1 | 0 | 0 | 0 | 1 | 0 | 0 | 0 | 1 | 0 | 0 | 0 | 1 | 0 | 1 | 0 | 0 | 1 | 1 | 0 | 0 | 1 | 1 | 1 |
| 30 | 0 | 1 | 1 | 0 | 1 | 1 | 1 | 1 | 0 | 0 | 1 | 0 | 1 | 0 | 1 | 1 | 1 | 0 | 1 | 0 | 1 | 0 | 0 | 1 | 0 | 1 | 1 | 0 | 0 | 1 | 1 | 0 |
| 31 | 1 | 1 | 1 | 1 | 1 | 1 | 0 | 0 | 1 | 0 | 0 | 1 | 1 | 0 | 1 | 0 | 1 | 0 | 1 | 0 | 0 | 1 | 1 | 1 | 1 | 1 | 0 | 0 | 1 | 1 | 1 |
| 32 | 1 | 0 | 1 | 0 | 1 | 0 | 1 | 0 | 1 | 1 | 1 | 1 | 0 | 1 | 0 | 0 | 1 | 1 | 1 | 0 | 1 | 0 | 0 | 1 | 1 | 0 | 0 | 0 |

HOLOGRAPHIC CODE DIVISION MULTIPLE ACCESS

This is a division of application Ser. No. 07/824,785, filed Jan. 15, 1992, now U.S. Pat. No. 5,216,529, issued Jun. 1, 1993.

FIELD OF THE INVENTION

This invention relates generally to optical fiber communication systems and, in particular, to code division multiple access systems wherein the information content communicated between each source/receiver pair is decoupled from the encoding/decoding operations.

BACKGROUND OF THE INVENTION

The proliferation of fiber-optic cables and the ever increasing demand for new broadband services is moving future telecommunication networks toward all-optical networks. By design, all-optical networks perform key signal processing such as switching, multiplexing, demultiplexing, amplification, and correlation, with optical systems and avoid electrical-to-optical and optical-to-electrical conversions. Optical systems or optical signal processing should alleviate the predicted bottleneck that could occur with complex high-speed electronic switches, multiplexers, demultiplexers, and so forth, because all-optical techniques are potentially much faster than electrical signal processing. Several new classes of optical networks are emerging. In particular, code division multiple access (CDMA) networks using optical signal processing technique have been recently introduced. For example, the special issue on "Optical Multiaccess", as published in the IEEE Network Magazine, vol. 3, no. 2, March 1989 provides an overview of this emerging field.

In a typical CDMA system, multiaccess is achieved by assigning different, minimally interfering code sequences to different user pairs. Users then communicate by imprinting their message bits upon their own unique code, which they transmit asynchronously (with respect to the other transmitters) over a common channel. A matched filter at the receiver end ensures that message bits are detected only when they are imprinted on the proper code sequence. This approach to multiaccess allows transmission without delay and handles multiaccess interference as an integral part of the scheme.

Processing gain (PC) for CDMA techniques is a critical parameter which may be used to judge the relative merits of CDMA systems. Processing gain is broadly given by the ratio of total transmitted bandwidth to information bandwidth of a transmitter. The value of PG establishes an upper bound on the number of users/transmitters that can be simultaneously active on a given CDMA system. Presently known CDMA techniques such as spread-spectrum and spread-time (which will be discussed in detail below) can only incrementally increase the PG since the total transmitted bandwidth is usually fixed, implying that the information bandwidth must be decreased in order to increase the PC. A large reduction in information bandwidth is difficult to achieve for arbitrary information sources.

In addition, with conventional CDMA techniques all transmitters have essentially the same signal format and data rate. This precludes a mixed multiuser environment wherein it is desired to transmit analog voice, low rate data, a TV signal, and so forth simultaneously over the CDMA system.

SUMMARY OF THE INVENTION

These shortcomings and other limitations are obviated, in accordance with the present invention, by arranging a CDMA system such that: parameters determining the processing gain are decoupled from both total bandwidth and information bandwidth; and the signal format and information rate of each user is independent of other users.

Broadly, the CDMA system in accordance with the present invention interconnects numerous sources to corresponding receivers through an optical broadcast network. Optical encoders are interposed between the sources and the optical broadcast network, and optical detectors are located between the optical broadcast network and the receivers. Each optical encoder includes a two-dimensional, spatial encoding mask for encoding a light signal produced by the associated source. The spatial encoding mask is determined from sequences having appropriate autocorrelation and crosscorrelation properties, so that each encoder generates a corresponding optically encoded signal. The optical broadcast network combines the numerous optically encoded signals produced by the encoders to generate a composite optical signal composed of all the encoded light signals. Each optical detector is assigned to detect one (or more) of the optically encoded signals, that is, the information content of one of the sources, and each optical detector includes a holographic decoding mask corresponding to the assigned source.

The organization and operation of this invention will be understood from a consideration of the detailed description of the illustrative embodiment, which follows, when taken in conjunction with the accompanying drawing.

BRIEF DESCRIPTION OF THE DRAWING

FIG. 3 lists the array of (0,1) pixels from an exemplary holographic mask;

DETAILED DESCRIPTION

To properly place in perspective the inventive aspects of the present invention, an overview of the present invention couched in terms related to prior art techniques is first presented. This approach also has the advantage of introducing notation and terminology. Next, a detailed description of an illustrative embodiment completes the disclosure.

Overview

The techniques of spread-spectrum and spread-time CDMA spread the energy of the information signal over a wide frequency band or over a long time period, respectively. For an elucidating discussion of spread-spectrum techniques, the article entitled "Spread Spectrum for Commercial Communications," by Schilling et al, as published in IEEE Communications Magazine, Vol. 29, No. 4, April 1991 is particularly relevant. Also, the paper entitled "Spread Time Code Division Multiple Access" by Crespo, Honig, and Salehi, as published in the Globecom Proceedings, December, 1991 provides a detailed discussion of the spreadtime approach.

In accordance with the present invention, which is referred to generically as spread-space CDMA, energy of the information signal is spread over a large spatial domain. In general, spreading the energy of a given information signal and the subsequent despreading of the energy is known as encoding and decoding of the information signal. Therefore, in the spread-spectrum technique, encoding and decoding are obtained in time domain, and in the spread-time technique, encoding and decoding are obtained in frequency domain, whereas in the spread-space technique, encoding and decoding are obtained in spatial domain.

In both spread-spectrum and spread-time CDMA techniques, information waveforms (modulating signals) are represented as digital signals, i.e., they exclude the use of analog signals, and all users have identical bit rate and signal format. However, in spread-space CDMA technique, the modulating signal for each user can take on any form (digital or analog), any rate, and any shape. For example, in a multiuser environment a particular user can be sending analog video while other users are sending digitized voice, analog voice, low rate data, and a very high rate data signal. This means that the spread-space CDMA technique remains transparent to the form of modulation format of each user. This advantage is obtained by transferring the CDMA encoding and decoding to spatial domain while modulating the information signal in the time domain.

Processing Gain (PG) for spread-spectrum and spread-time systems is defined as the ratio of total transmitted bandwidth (basically, a function of encoding and decoding speed) to the information bandwidth. Processing Gain is the single most important design parameter in any CDMA system. Its value puts a limit on the number of users that can operate simultaneously in a CDMA system. To increase the number of users in a CDMA system from its present value (operating at some bit-error rate), the PG for that system must increase. There are two ways to increase the PG. First, by increasing the channel bandwidth (that is, the encoding and decoding speed), or second, by reducing the information rate. In optical networks where channel bandwidth is not as scarce a commodity as in other systems, one may design all-optical encoders and decoders that have speeds which are 3 to 4 orders of magnitude faster than the information source. But, in CDMA systems such as in radio cellular telephony channel bandwidth is finite and scarce. Thus, reducing the information rate may prove to be the only realistic alternative. The difficulty in increasing PG, thereby increasing the number of simultaneous users, with the spread-spectrum and spread-time CDMA techniques is due to their dependency on the input information rate. However, the uncoupling between the two domains of signal processing, i.e., spatial domain for CDMA encoding and decoding and time domain for information modulation, contributes to another and a very important feature in spread-space CDMA, namely, the uncoupling of the PG from its input information rate. That is, input information rate for each user can be different while the PG for all the users is the same. Processing Gain in an optical spread-space CDMA, which will be discussed in more detail below, is proportional to the number of pixels in a mask and the value of PG is independent of input information rate or from any modulation format. The number of distinct pixels in a mask of area A can be as high as $A/\lambda^2$, where $\lambda$ is the wavelength of the light used in the system. For $A=1$ cm$^2$ and typical operating wavelengths (1-2 microns) this corresponds to $10^6-10^8$ pixels or PG for spread-space CDMA system. Since the PG for typical spread-spectrum or spread-time CDMA techniques is $10^2-10^3$, then spread-space CDMA can potentially support 4 to 5 orders of magnitude more users. For example, if one to ten percent of PG is taken as the number of users that can be supported by any of the CDMA techniques, then spread-space CDMA can support as many as tens of thousands to a few million users where each user can utilize any input information rate and any modulation format.

Illustrative Embodiment

Figure 1:
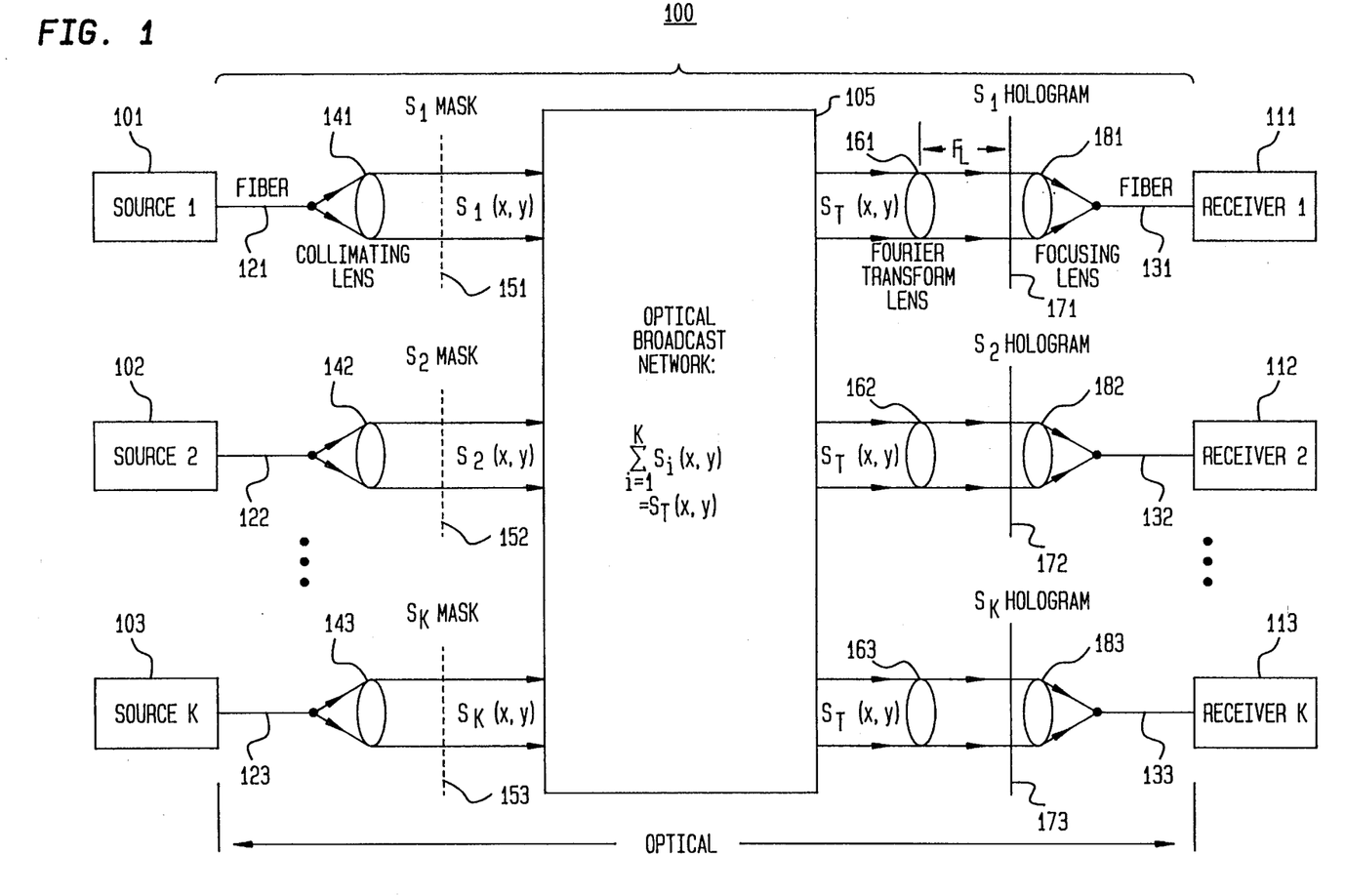
FIG. 1 is a diagram of the all-optical spread-space code division multiple access system in accordance with the present invention.

Spread-space CDMA system 100, depicted partly in block diagram form and partially in component form in FIG. 1, interconnects sources 101,102, . . . 103 to receivers 111,112 . . . 113, respectively. (System 100 may also be referred to as a Holographic CDMA system for reasons that will become apparent as the description proceeds.) Each source 101,102, or 103 can produce either analog or digital signals, may operate at an arbitrary information rate, and need not be compatible with the other sources. Moreover, the information generator included within each source (not explicitly shown), such as a voice signal or a TV camera, may be electronic so that each source 101,102, or 103 would include an electro-optical interface to its corresponding fiber medium. Each receiver 111, 112, or 113, which is matched to a corresponding source in the sense that each receiver is arranged to detect the analog or digital format at the incoming information rate, either electronically or electro-optically depending on the original information generator at the corresponding source.

Figure 2:
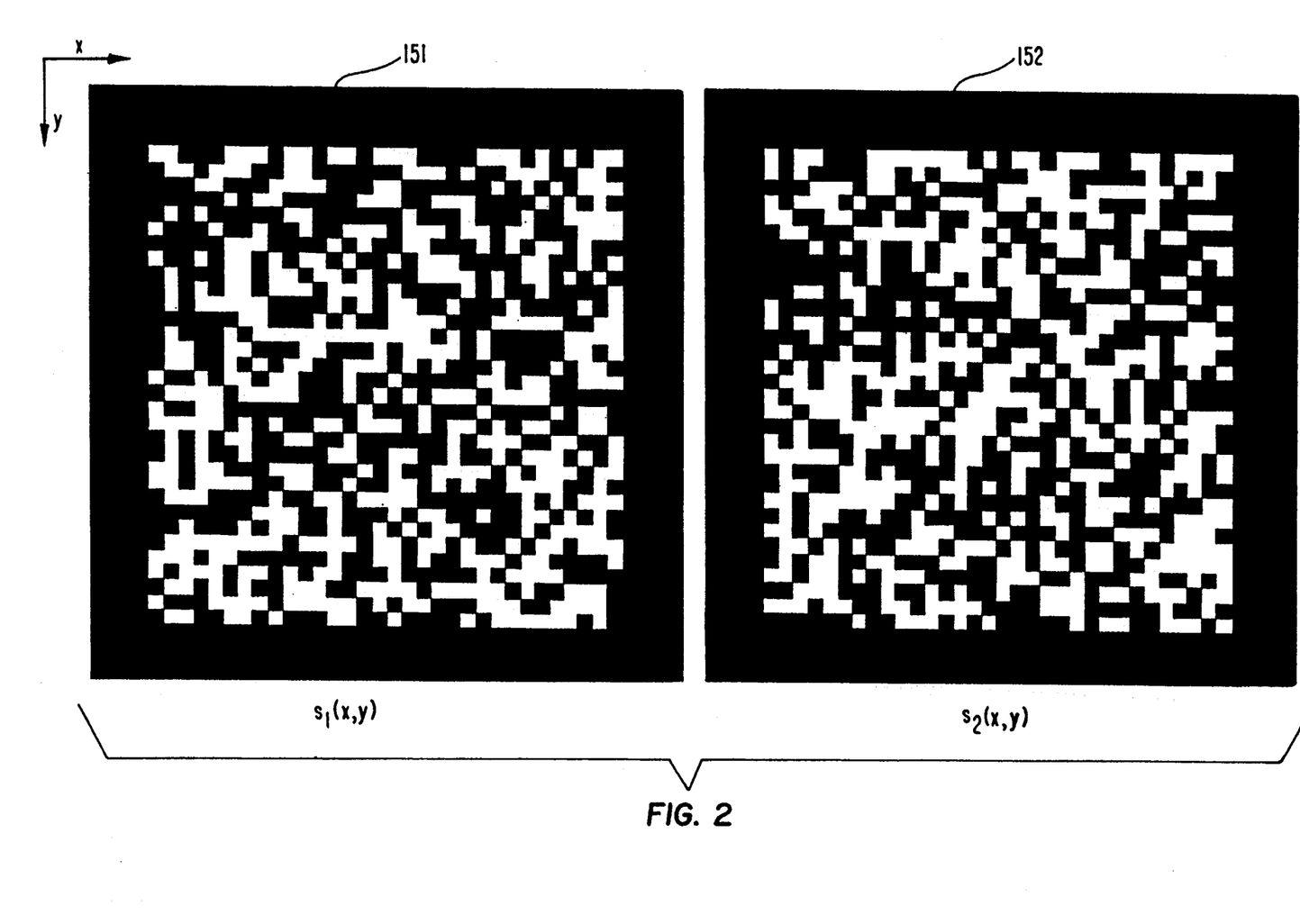
FIG. 2 illustrates two holographic masks assigned to first and second source-receiver pairs.

Since each source 101,102, or 103 is arranged with an interface so as to propagate an optical signal representative of the information content of the source, a monochromatic light signal is propagated onto a fiber optic medium associated with each source; for example, source 101 launches a monochromatic light signal onto fiber 121. Holographic encoding for the monochromatic light signal emanating from fiber 121 is obtained by: (1) collimating the monochromatic light signal with collimating lens 141; and (2) modulating the collimated monochromatic light signal emerging from lens 141 with a two-dimensional mask 151 having an array of two-dimensional code elements, that is, modulation is obtained by placing mask 151 behind collimating lens 141. Mask 151 has a transmission characteristic which is proportional to a two-dimensional code. Exemplary code elements are members the set (0,1), where a 0 corresponds to opaque area on mask 151 and a 1 corresponds to a transparent area on mask 151. (Another exemplary set is $(+1,-1)$, where $+1$ corresponds to transmission with zero phase shift, and $-1$ corresponds to transmission with a $\pi$ phase shift). Two typical two-dimensional codes, designated $s_1(x,y)$ and $s_2(x,y)$, where x and y are spatial coordinates, are shown in FIG. 2, and illustratively correspond to masks 151 and 152, respectively. For each exemplary mask 151 or 152, there are 1024 (32×32) pixels, that is, the code length for each mask is 1024. The 32×32 pixels array for mask 151 is listed in FIG. 3. It is possible to have as many as $10^6$–$10^8$ pixels in a 1 cm by 1 cm mask.

The two-dimensional codes for Holographic CDMA can be obtained from binary sequences of length n, whose autocorrelation is either 1 or $-1/n$, by the conventional method discussed in the paper "Pseudo-random Sequences and Arrays", authored by F. Macwilliams and N. Sloane, and published in the Proceedings of the IEEE, Vol. 64, No. 12, pp. 1715–1729, December, 1976. The two-dimensional codes as described in the reference generally satisfy the requirements of randomness and have autocorrelation and crosscorrelation properties that are necessary for the family of two-dimensional codes used for Holographic CDMA systems. For a pseudorandom array (a two-dimensional code with flat autocorrelation function) with n pixels there are n different arrays, with each array obtained simply by considering each shift of the original array to be a different array. Then for a Holographic CDMA system with K users, where $K \leq n$, each shift can be assigned to a different source/user in system 100.

The light signals transmitted through masks 151–153 in FIG. 1, designated as $S_1(x,y)$, $S_2(x,y)$, and $S_K(x,y)$, respectively, serve as inputs to optical broadcast network 105. Network 105 is arranged to form a composite signal, designated $S_T(x,y)$, which has the following form:

$$S_T(x,y) = \sum_{i=1}^{K} S_i(x,y), \tag{1}$$

where K is the number of sources/users. Thus $S_T(x,y)$ is a linear combination of all the modulated light signals transmitted by masks 151–153.

Figure 4:
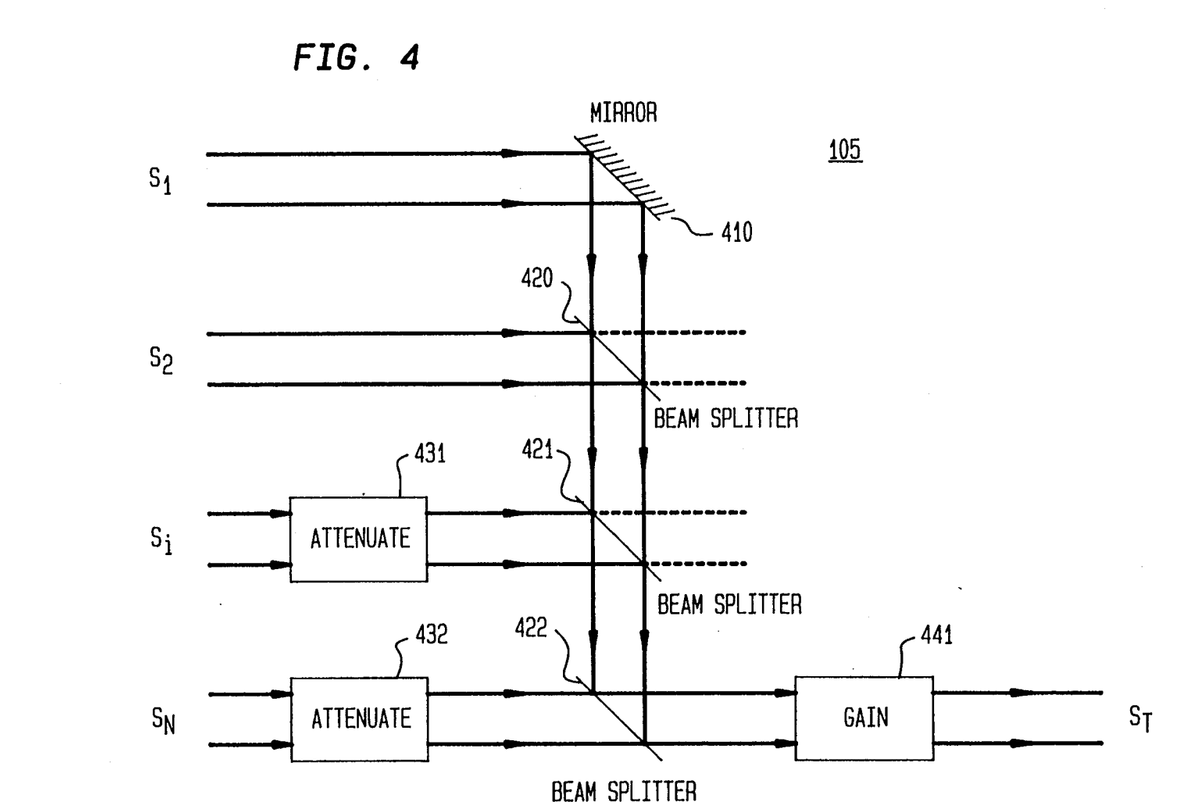
FIG. 4 depicts an illustrative embodiment of an optical broadcast network used to form a composite light signal.

The arrangement of FIG. 4 depicts an illustrative embodiment for optical broadcast network 105 of FIG. 1. Optical signals $S_1$, $S_2$, $S_i$, and $S_K$ (the argument (x,y) for each signal has been dropped for ease of presentation), serve as inputs to network 105. $S_1$ is reflected from mirror 410 onto beam splitter 420. $S_2$ also impinges on beam splitter 420 so that the output from splitter 420 in the downward direction towards beam splitter 421 may be expressed as $(S_1+S_2)/2$. $S_i$, that is, the signal originating from the $i^{th}$ source (not shown explicitly in FIG. 1) and impinging on network 105, passes through attenuator 431 and excites beam splitter 421 in the horizontal direction. The attenuator is set to 0.5 so that the signal emanating from splitter 421 is the downward direction towards beam splitter 422 is expressed as $(S_1+S_2+S_i)/4$. Finally, $S_K$ is passed through attenuator 432, with its attenuation value set at 0.25, and impinges on beam splitter 422 along with the output of splitter 421. The composite signal emerging from splitter 422 in the horizontal direction, which may be represented by $(S_1+S_2+S_i+S_K)/8$, is passed through optical gain device 441. If device 441 has a gain of 8.0, then the signal emerging from device 441 is $S_T$ as defined in equation (1).

Again with reference to FIG. 1, composite signal $S_T(x,y)$ emerges on K optical paths from network 105. The first output optical path feeds $S_T(x,y)$ to Fourier Transform lens 161. Hologram 171, also labeled as $S_1$ Hologram in FIG. 1, is placed at the focal length distance ($F_L$) behind lens 161. The signal transmitted through hologram 171 is intercepted by focusing lens 181 placed in a strategically located position behind hologram 171; the precise placement will be discussed below shortly. Lens 181 delivers a demodulated optical signal to fiber 131, and in turn, fiber 131 propagates this demodulated optical signal to receiver 111. The combined operation of the cascade of Fourier Transform lens 161, hologram 171, and focusing lens 181 is referred to as optical holographic CDMA decoding using an optical matched filter.

Holographic CDMA decoding is obtained by arranging lens 161, hologram 171 and lens 181 to implement the optical matched filter; this filter maximizes the ratio of peak signal energy to rms noise. One realization of this matched filter is obtained by an optical method introduced by A. Vander Lugt in the article entitled "Signal Detection by Complex Spatial Filtering", as published in the IEEE Transactions of Information Theory, IT 10:2, pp. 139,145, April, 1964. The optical matched filter has a transfer function which is the complex conjugate of the code image spectrum.

Figure 5:
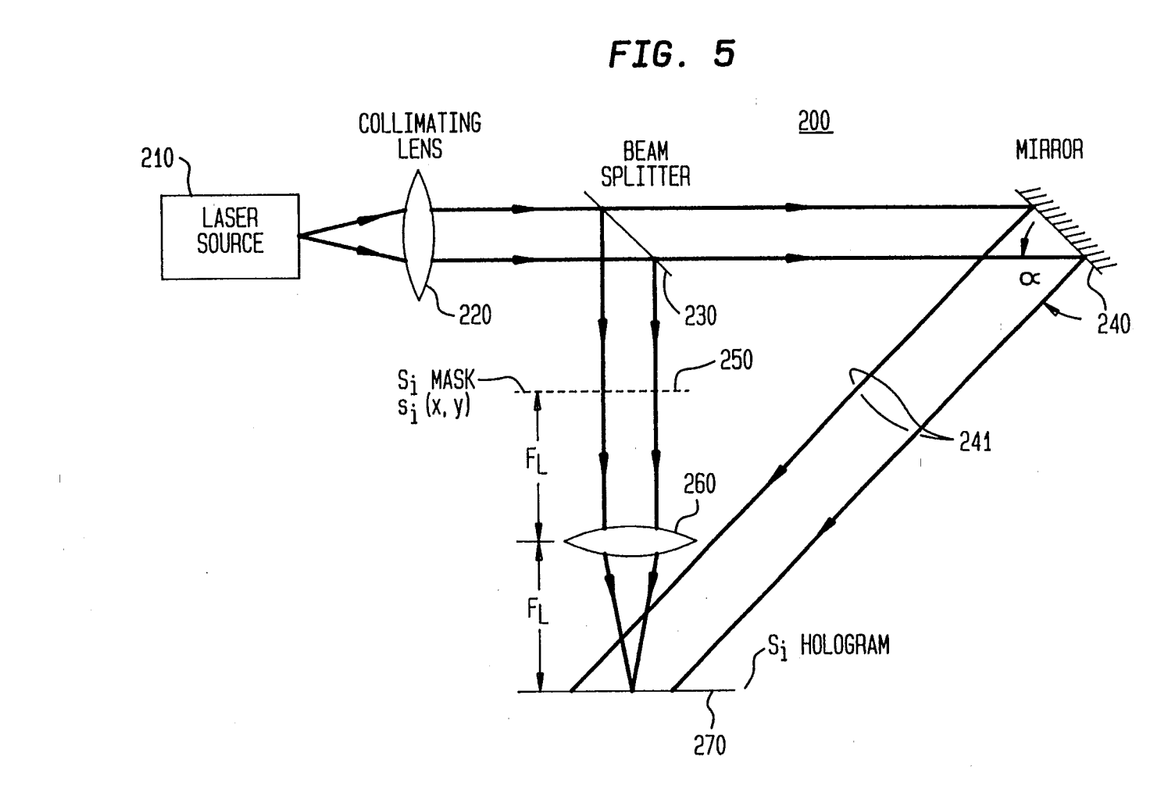
FIG. 5 is an arrangement for generating unique holograms used in optical matched filters.

With reference to FIG. 5, there is shown hologram generator arrangement 200 for generating each $S_i$ Hologram for the $s_i(x,y)$ mask, $i=1,2\ldots K$, of FIG. 1. Arrangement 200 uses reference beam 241 to interfere with the output of Fourier transform lens 260 at hologram 270. Hologram 270 is any medium that registers light intensity, such as photographic film. Laser source 210, which is illustratively an argon laser operating at 514.5 nm, illuminates collimating lens 220; in turn, the output of lens 220 is directed to beam splitter 230, with the horizontally transmitted component impinging on mirror 240 and the vertically deflected beam being modulated by mask 250 representative of array $s_i(x,y)$, $i=1, 2 \ldots$, or K. The angle of light signal 241 reflected by mirror 240 is $\alpha$. The output light from mask 250 impinges on Fourier Transform lens 260. Finally, both the light signal from lens 260 and the reflected light from mirror 240, shown as beam 241, are focused on hologram 270. Arrangement 200 creates the desired intensity pattern on hologram 270 so that when each hologram representative of each unique $s_i(x,y)$ mask is embedded in system 100 of FIG. 1, matched filter detection may be effected.

Again with reference to FIG. 5, if $F_1(p,q)$ denotes the output of lens 260, which displays a light signal which is the Fourier transform of $s_1(x,y)$ at its back focal plane, with p and q representing spatial frequency, and if R (p,q) represents the light coming from mirror 240, with $R(p,q)=[R(p,q)]e^{j\phi(p,q)}$, where $[R(p,q)]$ is a constant and $\phi(p,q)$ is linear in phase, then the intensity pattern on the holographic recording film is, $$\begin{aligned} H(p,q) &= |R(p,q) + F_i(p,q)|^2 \\ &= |R(p,q)|^2 + |F_i(p,q)|^2 + \\ &\quad R^*(p,q)F_i(p,q) + R(p,q)F_i^*(p,q) \end{aligned} \tag{2}$$

The fourth term in equation (2) represents the desired filter function, $F_i^*(p,q)$, multiplied by the linear phase factor of $R(p,q)$ since $[R(p,q)]$ is constant. Once the matched filters, that is, the holograms, for different codes are sequentially produced beforehand by hologram generator 200, the holograms are then physically located at the receiving end of system 100, namely, as holograms 171, 172, 173.

Figure 6:
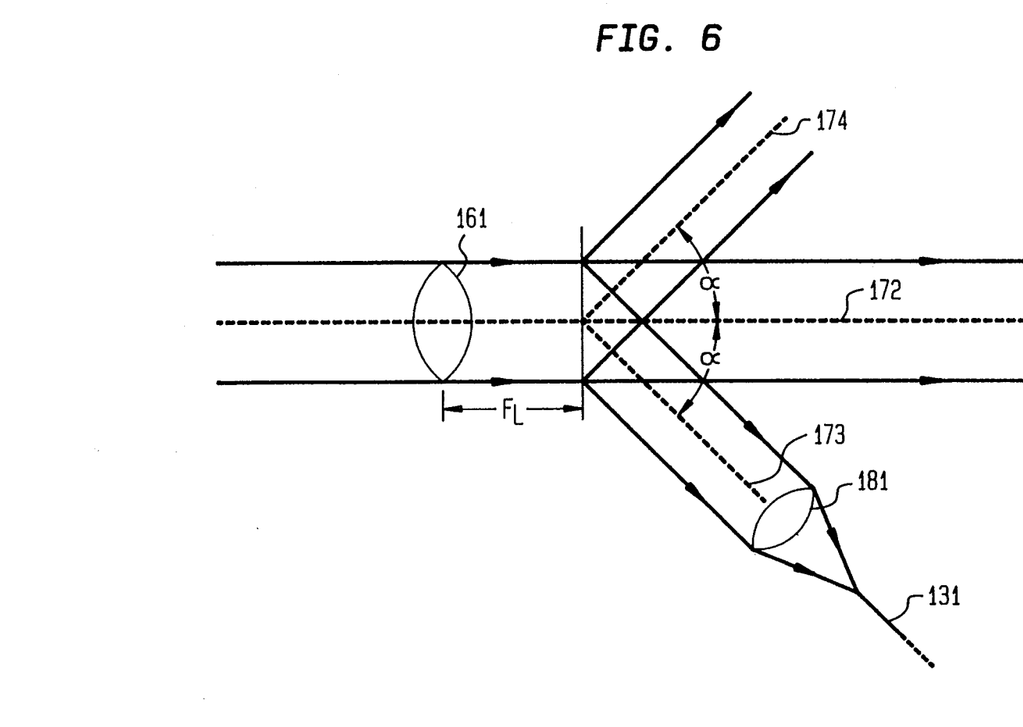
FIG. 6 illustrates the placement of collimating lens relative to the hologram of each decoding arrangement to achieve matched filter detection.

The exact placement of, for example, focusing lens 181 relative to hologram 171 in FIG. 1 is depicted in detail in FIG. 6. It can be demonstrated that the first two terms from equation (2) give rise to a light beam aligned with optical axis 172 of FIG. 6. For purposes of this invention, this light signal is ignored. Another transmitted light beam emerges from hologram along optical axis 173 which is offset from optical axis 172 by the downwardly directed angle a. This light signal along axis 173 is the output from the optical matched filter and corresponds to the fourth term in equation (2). Finally, for completeness, the third term in equation (2) corresponds to the beam emerging from hologram 171 along optical axis 174 at an upward angle a, and this beam is also ignored. Complete details for aligning lens 181 with hologram 171 may be found in the text "Introduction to Fourier Optics", authored by J. W. Goodman, published by McGraw-Hill Book Company, 1968; particular reference should be made to pages 171–177.

Briefly, by way of an operational description, the component $S_1(x,y)$ present in $S_T(x,y)$ will have a wavefront curvature which will be brought into focus by Fourier Transform lens 181 to thereby generate a bright intensity light signal focused at the input to fiber medium 131; this focusing occurs since $S_1$ hologram 171 is matched to mask 151, that is, the $s_1(x,y)$ mask.

On the other hand, when, for example, light component $S_2(x,y)$ in the composite signal $S_T(x,y)$ is incident on the hologram 171, the output will have a random-like wavefront curvature which will not be brought to a bright focus by the Fourier Transform lens 181. If it is assumed the properly decoded signal has a bright spot with intensity one, any other signal present in the composite signal will have, on average, an intensity $$\frac{1}{NM},$$

where $NM = n$ is the number of pixels in a mask (code) with $N \times M$ dimensions. The large contrast in the intensities between a matched, decoded signal and an unmatched, decoded signal is used to distinguish between correctly and incorrectly addressed signals, that is, to distinguish among sources.

It is to be understood that the above-described embodiments are simply illustrative of the application of the principles in accordance with the present invention. Other embodiments may be readily devised by those skilled in the art which may embody the principles in spirit and scope. Thus, it is to be further understood that the methodology and concomitant circuitry described herein is not limited to the specific forms shown by way of illustration, but may assume other embodiments limited by the scope of the appended claims.

What is claimed is:

1. An encoder for encoding a plurality of incoming temporal information-bearing light signals to produce a plurality of spatially modulated light signals, the encoder comprising:

light source means for generating a plurality of temporally modulated information-bearing light signals, a plurality of fibers, each of said fibers for guiding an associated one of said temporally modulated information-bearing light signals from said light source means, a plurality of input collimating lenses, each optically coupled to a respective one of said fibers, for spatially spreading the associated incoming temporally modulated light signal to produce an associated spread light signal, and a plurality of encoding masks, each of said masks optically coupled to a respective one of said input collimating lenses, for modulating said associated spread light signal to produce a spatially modulated light signal, each of said masks including first regions having a first transmission characteristic and second regions having a second transmission characteristic, said first and second regions arranged according to a preselected pattern from a set of two-dimensional code patterns having at least pseudo-random arrays and wherein said patterns correspond to sequences with predetermined correlation properties.

2. A method for encoding a plurality of incoming temporal information-bearing light signals to produce a plurality of spatially modulated light signals, the method comprising the steps of:

generating a plurality of temporally modulated information-bearing light signals and transmitting the temporally modulated information-bearing light signals on individual optical fibers, spatially spreading the temporally modulated incoming light signals received from each of the optical fibers with individual input collimating lenses to produce spread light signals, and modulating each said spread light signal with an encoding mask uniquely associated with each said spread light signal to produce the spatially modulated light signals, each said mask including first regions having a first transmission characteristic and second regions having a second transmission characteristic, said first and second regions arranged according to a preselected pattern from a set of two-dimensional patterns having at least pseudo-random arrays and wherein said patterns correspond to sequences with predetermined correlation properties.

* * * * *